US010423616B2

(12) United States Patent
Li et al.

(10) Patent No.: US 10,423,616 B2
(45) Date of Patent: Sep. 24, 2019

(54) USING LOCAL MEMORY NODES OF A MULTICORE MACHINE TO PROCESS A SEARCH QUERY

(71) Applicant: Hewlett Packard Enterprise Development LP, Houston, TX (US)

(72) Inventors: Jun Li, Mountain View, CA (US); Krishnamurthy Viswanathan, Mountain View, CA (US); Mijung Kim, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 245 days.

(21) Appl. No.: 15/307,043

(22) PCT Filed: Apr. 30, 2014

(86) PCT No.: PCT/US2014/036253
§ 371 (c)(1),
(2) Date: Oct. 27, 2016

(87) PCT Pub. No.: WO2015/167562
PCT Pub. Date: Nov. 5, 2015

(65) Prior Publication Data
US 2017/0046382 A1 Feb. 16, 2017

(51) Int. Cl.
*G06F 16/22* (2019.01)
*G06F 16/903* (2019.01)
*G06F 16/2453* (2019.01)

(52) U.S. Cl.
CPC .... *G06F 16/24532* (2019.01); *G06F 16/2255* (2019.01); *G06F 16/2264* (2019.01); *G06F 16/90339* (2019.01)

(58) Field of Classification Search
CPC .......... G06F 17/30445; G06F 17/3033; G06F 17/30333; G06F 17/30982;
(Continued)

(56) References Cited

U.S. PATENT DOCUMENTS 5,299,262 A   3/1994 Brickell et al.
6,778,977 B1  8/2004 Avadhanam et al.
(Continued)

FOREIGN PATENT DOCUMENTS

EP         2750047        7/2014
WO    WO-2013038574 A1   3/2013

OTHER PUBLICATIONS

Cheng e tal., Article: "Fast and Accurate Image Matching with Cascade Hashing for 3D Reconstruction"; The IEEE Conference on Computer Vision and Pattern Recognition (CVPR), 2014, pp. 1-8. (Year: 2014).*

(Continued)

*Primary Examiner* — Evan Aspinwall
(74) *Attorney, Agent, or Firm* — Trop, Prunner & Hu, P.C.

(57) ABSTRACT

An example technique includes assigning partitions of a dataset of multidimensional points to a plurality of local memory nodes of a multicore machine and using the local memory nodes for a search query to determine similarity matches in the dataset for a given multidimensional point. The using includes parallel searching with the local memory nodes in the assigned partitions to identify candidate similarity matches to the given multidimensional point using indexes derived from the multidimensional points, the parallel searching for each node progressing through a sequence of search distances and providing an ongoing search result for each search distance from the given multidimensional point and regulating an extent of the parallel searching based on the ongoing search results.

15 Claims, 8 Drawing Sheets

(58) Field of Classification Search
CPC ......... G06F 16/24532; G06F 16/90339; G06F 16/2255; G06F 16/2264
USPC ........................................................ 707/718
See application file for complete search history.

(56) References Cited

U.S. PATENT DOCUMENTS

| | | | |
|---|---|---|---|
| 7,025,724 | B2 | 4/2006 | Adam et al. |
| 7,168,025 | B1 | 1/2007 | Berkovich |
| 7,373,302 | B1 | 5/2008 | Jastrzebski et al. |
| 7,748,022 | B1 | 6/2010 | Frazier |
| 7,966,332 | B2 | 6/2011 | Altevogt et al. |
| 8,370,338 | B2 | 2/2013 | Gordo et al. |
| 8,438,275 | B1 | 5/2013 | Brooker |
| 8,510,236 | B1 | 8/2013 | Kumar et al. |
| 8,515,964 | B2 | 8/2013 | Ravikumar et al. |
| 8,952,991 | B1 | 2/2015 | Kelley et al. |
| 2004/0181522 | A1 | 9/2004 | Jardin |
| 2006/0116989 | A1 | 6/2006 | Bellamkonda et al. |
| 2006/0161546 | A1 | 7/2006 | Callaghan et al. |
| 2007/0168336 | A1 | 7/2007 | Ransil et al. |
| 2009/0112818 | A1 | 4/2009 | Jose et al. |
| 2010/0070509 | A1 | 3/2010 | Li et al. |
| 2010/0135484 | A1 | 6/2010 | Nishikawa et al. |
| 2010/0174714 | A1 | 7/2010 | Asmundsson et al. |
| 2010/0318492 | A1 | 12/2010 | Utsugi |
| 2011/0078130 | A1 | 3/2011 | Roizen et al. |
| 2011/0078133 | A1 | 3/2011 | Bordawekar et al. |
| 2011/0106743 | A1 | 5/2011 | Duchon |
| 2012/0166401 | A1 | 6/2012 | Li et al. |
| 2012/0197898 | A1 | 8/2012 | Pandey et al. |
| 2012/0259843 | A1 | 10/2012 | Child |
| 2013/0060783 | A1 | 3/2013 | Baum et al. |
| 2013/0091105 | A1 | 4/2013 | Bhave et al. |
| 2013/0103657 | A1 | 4/2013 | Ikawa et al. |
| 2013/0103658 | A1 | 4/2013 | Travis |
| 2013/0151535 | A1* | 6/2013 | Dusberger ........ G06F 17/30336 707/747 |
| 2013/0230255 | A1 | 9/2013 | Wang et al. |
| 2013/0238619 | A1 | 9/2013 | Hanaoka et al. |
| 2013/0246323 | A1 | 9/2013 | Athas et al. |
| 2013/0254191 | A1 | 9/2013 | He et al. |
| 2014/0201772 | A1 | 7/2014 | Neumeier et al. |

OTHER PUBLICATIONS

Nelluru, Article: "Fast Approximate k-Nearest Neighbors in High Dimensions"; Undergraduate Honors Thesis, Prad Nelluru, Department of Computer Science. The University of Texas at Austin. May 8, 2013. (Year: 2013).*
"Spatial, Temporal and Multimedia Databases", Jun. 1, 2012.
Cheng, J. et al; "Fast and Accurate Image Matching with Cascade Hashing for 3d Reconstruction"; http://www.nlpr.ia.ac.cn/jcheng/papers/CameraReady-CasHash.pdf.
Chou, J., et al.; "Parallel Index and Query for Large Scale Data Analysis"; Nov. 12-18, 2011; 11 pages.
Gil, M.S. et al, "Speed Up of Index Creation for Time-series Similarity Search with Handling Distortions", 2012.
Gosink, L. J., et al.; "Data Parallel Bin-based Indexing for Answering Queries on Multi-core Architectures"; 2009; 19 pages.
Nelluru, P; "Fast Approximate K-nearest Neighbors in High Dimensions"; May 8, 2013; http://apps.cs.utexas.edu/tech_reports/reports/tr/TR-2125.pdf.
Pasley, A. "Pattern Matching Against Distributed Datasets within DAME", Sep. 1, 2006.
Wu, et al., "A Comparison of DFT and DWT Based Similarity Search in Time-Series Databases", in CIKM, 2000, 17 pages.
Sundaram et al., "Streaming Similarity Search over one Billion Tweets using Parallel Locality-Sensitive Hashing", to appear in the Proceedings of VLDB, vol. 6, No. 14, 2013, pp. 1930-1941.
Rakthanmanon, et al., "Searching and Mining Trillions of Time Series Subsequences under Dynamic Time Warping", in VLDB, 2012, 9 pages.
Manku et al., "Detecting near-duplicates for web crawling", Proceedings of the 16th international conference on World Wide Web. ACM, 2007, pp. 141-150.
Lin, et al, "Experiencing SAX: a Novel Symbolic Representation of Time Series", Data Mining and Knowledge Discovery, vol. 15, issue 2, 2007, 31 pages.
Kulis et al., "Kernelized Locality-Sensitive Hashing for scalable image search," Proc. of IEEE International Conference on Computer Vision, 2009, 8 pages.
Korn, et al., "Efficiently Supporting Ad Hoc Queries in Large Datasets of Time Sequences", in SIGMOD Conference, 1997, 25 pages.
Koga et al., "Fast agglomerative hierarchical clustering algorithm using Locality-Sensitive Hashing", Knowledge and Information Systems, vol. 12, No. 1, 2007, pp. 25-53.
Keogh, et ai., "Dimensionality Reduction for Fast Similarity Search in Large Time Series Databases". Knowledge and Information Systems, vol. 3, Issue 3, 2001, 19 pages.
International Search Report and Written Opinion received for PCT Patent Application No. PCT/US2015/013952, dated Oct. 1, 2015, 8 Pages.
International Search Report and Written Opinion received for PCT Patent Application No. PCT/US2015/011852, dated Jun. 30, 2015, 9 pages.
International Search Report and Written Opinion received for PCT Patent Application No. PCT/US2014/036253, dated Jan. 26, 2015, 10 pages.
International Search Report and Written Opinion received for PCT Patent Application No. PCT/US2013/067773, dated Jul. 25, 2014, 10 pages.
International Preliminary Report on Patentability received for PCT Patent Application No. PCT/US2015/013952, dated Aug. 10, 2017, 7 pages.
International Preliminary Report on Patentability received for PCT Patent Application No. PCT/US2015/011852, dated Jul. 27, 2017, 8 pages.
International Preliminary Report on Patentability received for PCT Patent Application No. PCT/US2014/036253, dated Nov. 10, 2016, 9 pages.
International Preliminary Report on Patentability received for PCT Patent Application No. PCT/US2013/067773, dated May 12, 2016, 9 pages.
Indyk et al., "Approximate nearest neighbors: towards removing the curse of dimensionality", Proceedings of the Symposium on Theory of Computing (STOC), 1998, pp. 604-613.
Gionis et al., "Similarity search in high dimensions via hashing", Proceedings of the 25th International Conference on Very Large Data Bases (VLDB), 1999, pp. 518-529.
Faloutsos, et al., "Fast Subsequence Matching in Time-Series Databases", in SIGMOD Conference, 1994, 11 pages.
Ding, et al., "Querying and mining of time series data: experimental comparison of representations and distance measures". Proceedings of the VLDB Endowment, vol. 1 and 2, 2008, 11 pages.
Datar et al., "Locality-sensitive hashing scheme based on p-stable distributions", Proc. of the ACM Symposium on Computational Geometry (SOCG'04), 2004, pp. 253-262.
Das et al., "Google news personalization: scalable online collaborative filtering", Proceedings of the 16th international conference on World Wide Web. ACM, 2007, pp. 271-280.
Brinza et al., "RAPID detection of gene-gene interactions in genome-wide association studies", Bioinformatics, vol. 26, No. 22, 2010, pp. 2856-2862.
Berndt, et al., "Using Dynamic Time Warping to Find Patterns in Time Series", in KDD Workshop, Apr. 26, 1994, 12 pages.
Assent, et al., "The TS-Tree: Efficient Time Series Search and Retrieval", in Proceedings of the 11th international conference on Extending database technology: Advances in database technology (EDBT '08), 2008, 12 pages.
Andoni et al., "E2LSH: Exact Euclidean Locality-Sensitive Hashing", 2005, 2 pages.

(56) References Cited

OTHER PUBLICATIONS

"Proof of Concept for Hadoop: storage and analytics of electrical time-series", Jun. 20, 2012, 36 pages. Retrieved from the Internet <https://www.slideshare.net/Hadoop_Summit/proof-of-concent-with-hadoop>.

* cited by examiner

US 10,423,616 B2

USING LOCAL MEMORY NODES OF A MULTICORE MACHINE TO PROCESS A SEARCH QUERY

BACKGROUND

Quite often, a relatively large volume of data is searched for purposes of identifying and retrieving the closest matches to a search query. For example, the data may be time series data that may be, for example, acquired by a sensor. Issues with the sensor may be identified by searching for certain patterns in the time series data. The time series data may be searched for patterns for various other purposes, such as classification, pattern detection, modeling and anomaly detection, as examples.

DETAILED DESCRIPTION

Systems and techniques are described herein for purposes of processing a search query using a multiple core, or "multicore" machine. In this context, a "multicore" machine refers to a physical machine that contains a computing component with at least two independent central processing units (CPUs), or "processing cores." A given processing core is a unit that is constructed to read and execute machine executable instructions. In accordance with example implementations, the multicore machine may contain one or multiple CPU semiconductor packages, where each package contains multiple processing cores.

The use of a multi-core machine to process a search query, as disclosed herein, allows relatively time efficient searching of a relative large volume dataset for purposes of identifying and retrieving matches to the search query. As an example, the dataset that is searched may be time series data, or data that is derived from, for example, the time sampling of a particular value. As an example, a sensor may acquire time series data. It is noted, however, that the techniques and systems that are disclosed herein may be applied to relatively large volume data other than time series data. For example, the systems and techniques that are disclosed herein may be applied to processing search queries on any high dimensional data (multimedia image or video data, as other examples).

Identifying and retrieving time series segments that are similar to a segment that is specified by a search query may be useful for such purposes as classification, pattern detection, modeling, fault diagnosis and anomaly detection, as well as for other purposes. Performing a relatively time efficient search may allow the construction of better models; better pattern detection; faster fault analysis; more rapid classifications and more timely detection of anomalies. Other and different advantages may be achieved in accordance with further implementations.

Figure 1:
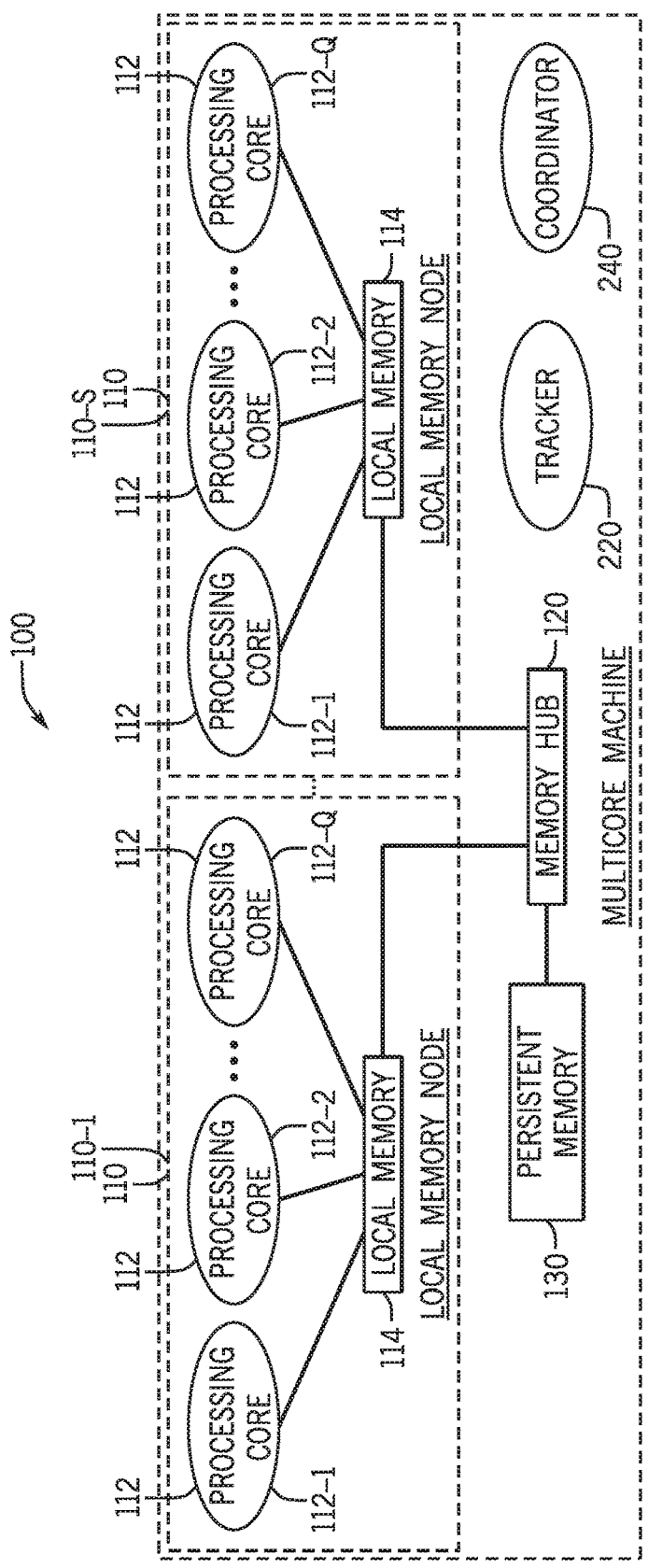
FIG. 1 is a schematic diagram of a multicore machine according to an example implementation.

In accordance with example implementations, processing of a search query may be performed by a multicore machine 100 that is depicted in FIG. 1. The multicore machine 100 is a physical machine that is constructed from actual machine executable instructions, or "software," and actual hardware. The hardware of the multicore machine 100 includes S local memory nodes 110 (local memory nodes 110-1 . . . 110-S, being depicted as examples in FIG. 1), which may be part of, for example, a particular multicore central processing unit (CPU) package. As depicted in FIG. 1, each local memory node 110 contains Q CPU processing cores 112 (processing cores 112-1, 112-2 . . . 112-Q, being depicted in FIG. 1 for each node 110) and a local memory 114.

The processing cores 112 experience relatively rapid access times to the associated local memory 114 of the same local memory node 110, as compared to, for example, the times to access the memory 114 of another local memory node 110. In this manner, access to a memory 114 of another local memory node 110 occurs through a memory hub 120 of the machine 100 or another interface, which introduces delays. In accordance with example implementations, each local memory node 110 contains a memory controller (not shown). In accordance with example implementations, the multicore machine 100 may have a non-uniform memory access architecture (NUMA); and the local memory nodes 110 may be NUMA nodes. FIG. 1 also depicts a persistent memory 130 (a non-volatile memory, such as flash memory, for example) that may be accessed by the processing cores 112 via the memory hub 120.

Figure 2:
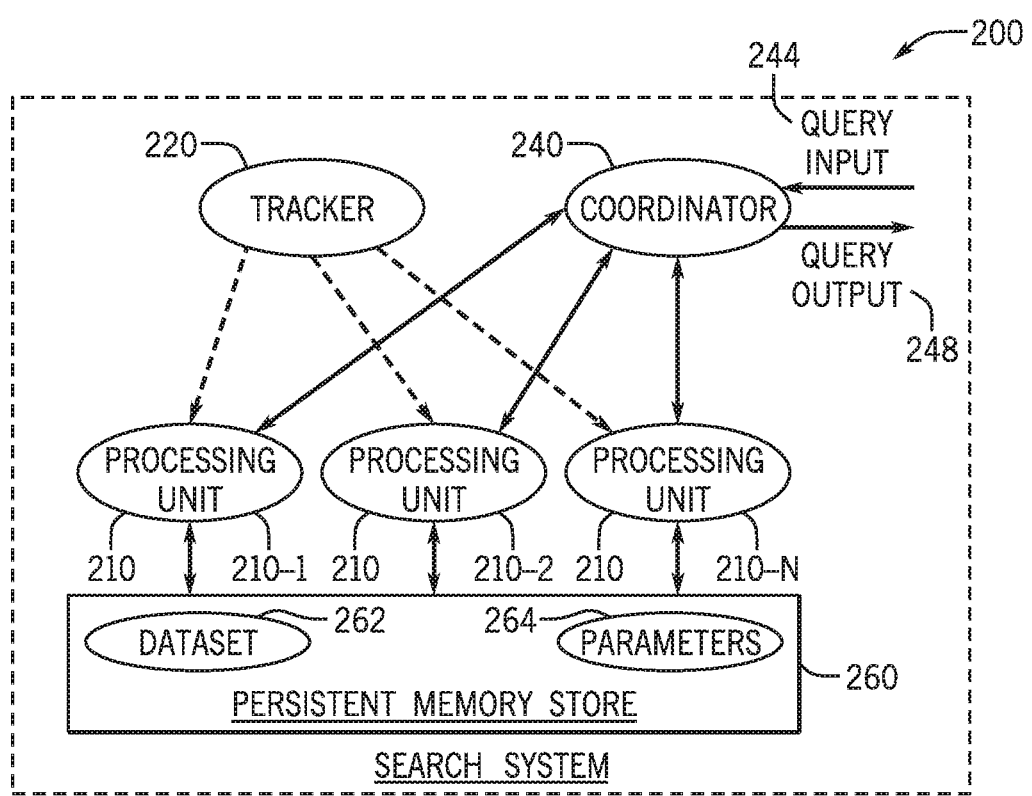
FIG. 2 is a schematic diagram of a search system used in connection with the multicore machine of FIG. 1 according to an example implementation.

Referring to FIG. 2 in conjunction with FIG. 1, in accordance with example implementations, a search system 200 that may be implemented on the multicore machine 100 includes a tracker 220; a coordinator 240; N multi-threaded logical processing units 210 (example logical processing 210-1, 210-2 . . . 210-N, being depicted as examples in FIG. 2) and a persistent memory store 260. In accordance with example implementations, the tracker 220, coordinator 240 and processing units 210 are components that are formed by the execution of machine executable instructions, or "software," by one or more of the processing cores 112. The persistent memory store 260 may be formed by storage provided by the persistent memory 130, for example.

In general, the coordinator 240 receives query input data 244, which specifies a given multidimensional point to be searched as part of a search query. The coordinator 240 provides query output data 248 that represents a top K number of similarity matches (also herein referred to as the "top K number" or the "top K results") to the search query. The tracker 220 launches a collection of the processing units 210 for purposes of performing the processing for the search query. The persistent memory store 260 stores a dataset 262, which represents, for example, an entire time series dataset to be searched; and the persistent memory store 260 stores parameters 264 that defines how the search is to be conducted, as further described herein.

In accordance with example implementations, the tracker 220 partitions the dataset 262; assigns the different dataset partitions among the processing units 210 for searching; and launches the processing units 210. In this manner, each processing unit 210 may load the data partition(s) assigned to it from the persistent memory store 260 and may load indexing and/or search information that includes index construction parameters into its local memory, as described further herein.

The processing units 210 communicate with the coordinator 240 for the purpose of regulating the extent of the search for a given search query. More specifically, in accordance with example implementations, a bi-directional communication occurs between each processing unit 210 and the coordinator 240. In accordance with example implementations, the coordinator 240 issues two types of commands to the processing units 210: 1) "start" and "stop" index building commands to the processing units 210, and 2) commands that regulates how the processing units 210 are to perform the search, including, for example, the command to start the query search and the command to abandon the current query search.

As the searches are being performed by the processing units 210, the coordinator 240 receives ongoing query responses from each processing unit 210 that identify the best, or top, candidate matches that have been discovered so far from the associated partition(s) assigned to each processing unit 210. At the conclusion of the search for a given query, the coordinator 240 aggregates the final query responses from all of the processing units 210 to form the final query output data 248, assuming that the search query criteria is satisfied. The coordinator 240 sends an abandonment command to each of the processing units 210 to prematurely end a given search in response to the coordinator 240 determining that the search query criteria has been met by the ongoing search responses that have been returned by the processing units 210.

For example implementations that are disclosed herein, the processing units 210 use locality sensitive hashing (LSH) to perform the searching, although other search techniques may be used, in accordance with further example implementations. An LSH-based index is a data structure that stores a collection D of points in a d-dimensional Euclidean space in such a manner that given a query point, the data structure, with relatively high probability, returns points in D that are within distance R of the query point; and the data structure does not return too many points that are at distance greater than cR. Here, "R" represents a search distance, and "c" represents a scaling factor, such that "c" determines the space that is occupied by the LSH-based index. The LSH-based index is applied to the problem of finding the closest time series segment to a given time series segment in the following manner, in accordance with example implementations. A processing unit 210 builds its index table located in the native memory that can be directly accessible by the processing unit 210, in accordance with example implementations.

For purposes of finding the top K most similar time series segments from the time series dataset 262 for a given time series segment as the search pattern, the length of the search pattern is fixed. Every candidate time series segment in the dataset 262 is treated as a point in high-dimensional space that is indexed. Assuming that "D" refers to a set of candidate points/time series segments, a sequence of locality sensitive hash indexes are built, with each being designed for a different value of search distance called "R." It is assumed that $R_0 < R_1 < R_2$, etc., denote the values of R for the indices. The entire time series data is partitioned into different corresponding partitions, and a separate set of LSH-based indices is constructed for each of the partitions. These indices can share the same R values, in accordance with example implementations.

Given a query, a search is first performed within each partition, with each of the indices, which corresponds to search distance $R_0$ for points that are within distance $R_0$. After all of the points from all the partitions discovered with the initial search are obtained, a check is performed for purposes of determining if the number of points obtained is greater than or equal to "K" (where "K" represents the number of closest points desired to be returned). If this is not the case, the procedure is repeated for each partition for the search distance $R_1$ and so on. In accordance with example implementations, the search is terminated after at least K points are found. As the search progresses, each of the candidate time series segments that are retrieved are compared with the query segment, and the K closest segments are returned.

In accordance with example implementations that are disclosed herein, the search problem is solved for a fixed length, or dimension, for the query search pattern, in this case called "d." In further implementations, the problem may be solved for multiple query lengths, with separate indexes being constructed for each of the query lengths.

Figure 3:
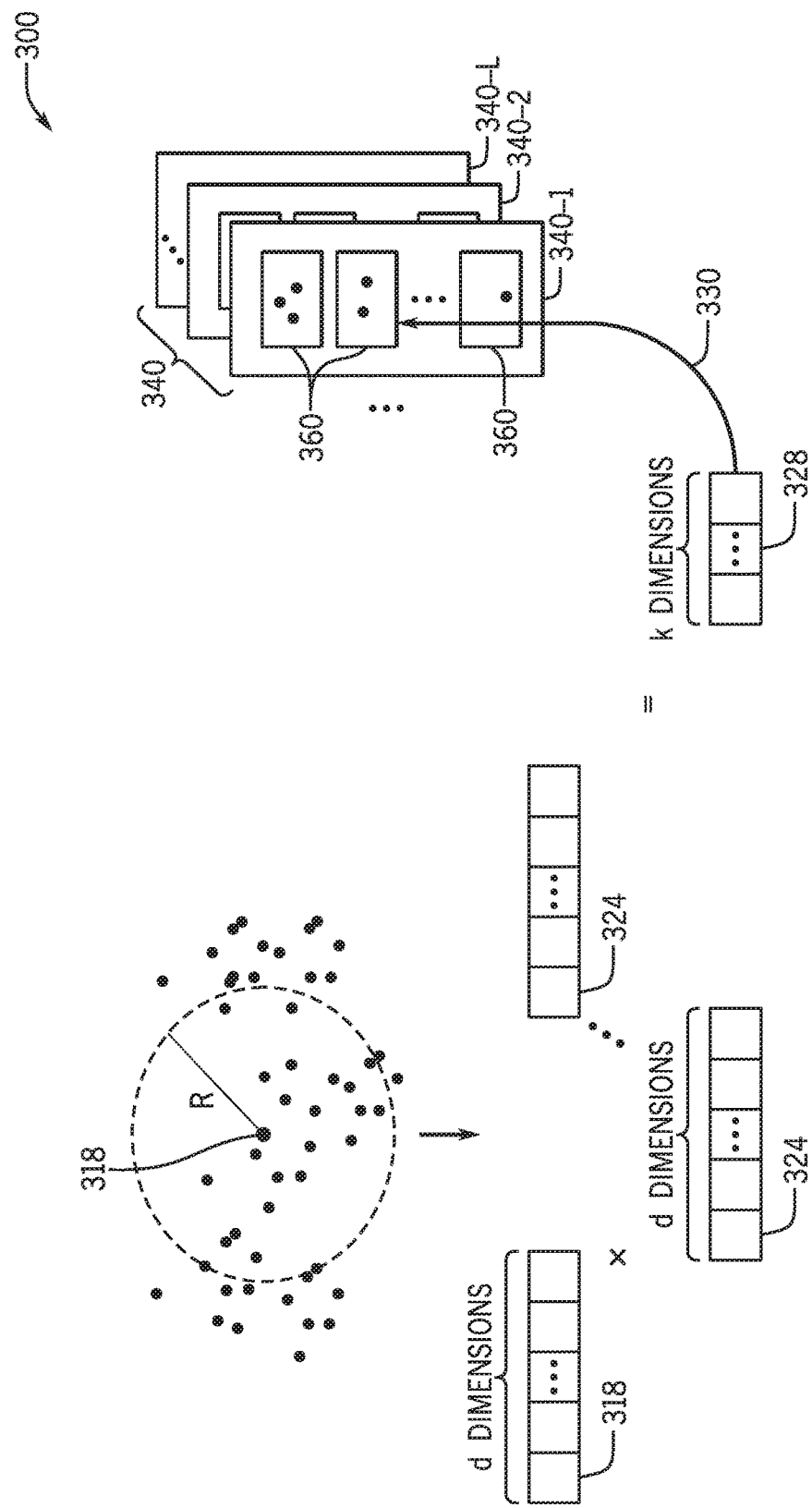
FIG. 3 is an illustration of locality sensitive hash (LSH)-based index building according to an example implementation.

FIG. 3 is an illustration 300 of Locality sensitive hashing-based index building according to an example implementation. Each point 318 to be indexed is a d-dimensional real vector. In general, the LSH-based index building generates k random Gaussian d-dimensional real vectors 324, and computes the inner product of 318 with each of the k random vectors. The results of the k inner products are quantized to obtain a k dimensional integer vector 328. The parameter k is selected so that a point at a distance more than c*R from a given point 318 is mapped to a different vector 328 with high probability. The points are stored in an LSH index-based collection 340 of hash tables (L example hash tables 340-1, 340-2 . . . 340-L, being depicted as examples in FIG. 3). Each hash table in the collection 340 contains groupings, or buckets 360, of the points; and the buckets 360 are indexed by the vectors 328. Closer points fall within the same group, or "bucket 360," within the hash table 340. The above-described process is repeated L times, which produces L hash tables 340.

Figure 4:
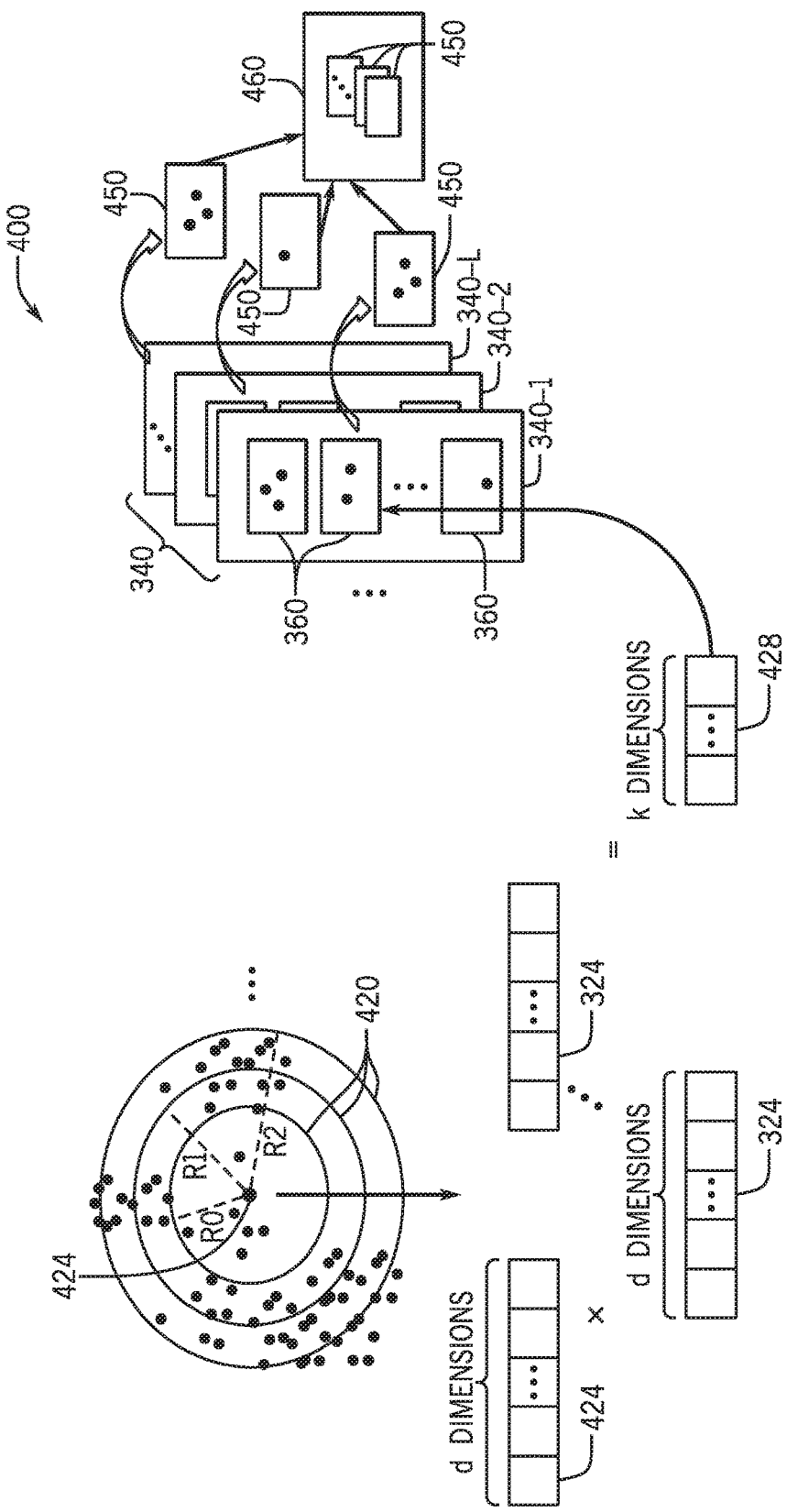
FIG. 4 is an illustration of an LSH-based index search according to an example implementation.

FIG. 4 is an illustration 400 of an LSH-based index search of data in response to a query using hash tables 340 that are constructed from the data, in accordance with example implementations. At query time, the same identical LSH hash function described in connection with FIG. 2 is applied to a multi-dimensional search query point 424, to determine L vectors 428, one for each of the L hash tables in the collection 340. The resulting search of a given hash table may identify a bucket 360 that contains a corresponding set of candidate matches, which is also referred to herein as a "bucket 450." FIG. 4 also illustrates merging of the buckets 450 derived from searches of multiple hash tables into a merged bucket 460 of candidate results. The merged candidate results 460 may further be searched (using a straightforward exhaustive search, as an example) based on distance to determine the closest matches.

The search may involve the evaluation of the query point 424 at different distances search distances $R_0$, $R_1$, $R_2$, and so forth. Thus, multiple searches may be performed, each at a different search distance R. The parameter L is selected so that if the set of high-dimensional points that are indexed contains any point within distance R of the query point, then the point is retrieved with a relatively high probability.

Figure 5:
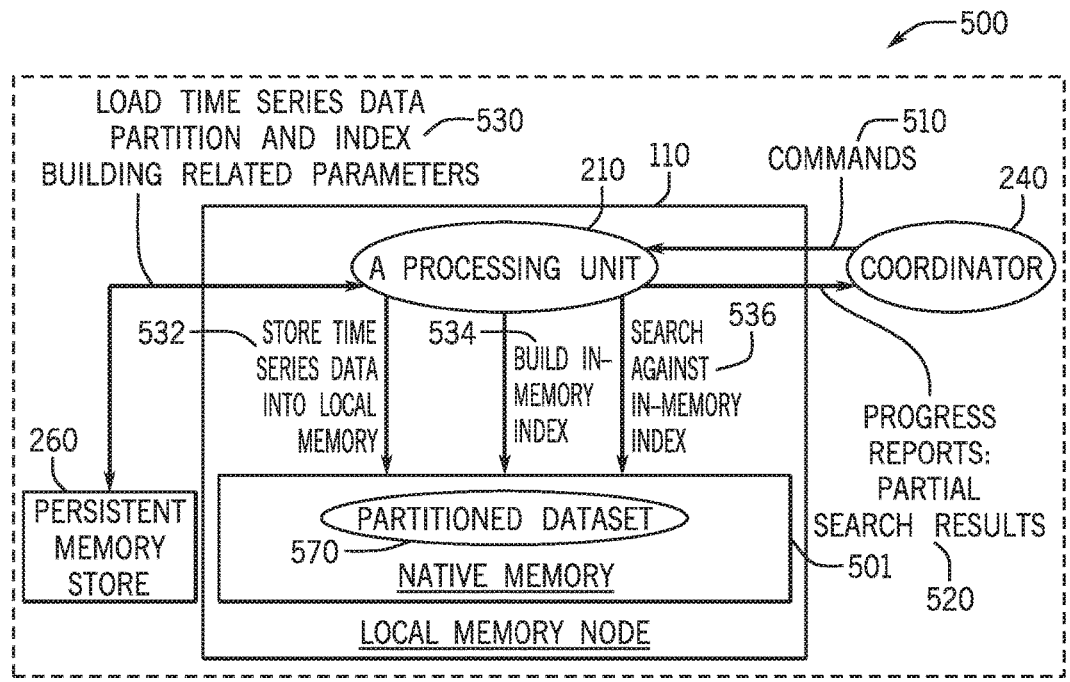
FIG. 5 is a schematic diagram of a local memory node of the multicore machine depicting interaction of a logical processing unit with a coordinator according to an example implementation.

FIG. 5 is an illustration 500 of the interaction of a given processing unit 210 with the coordinator 240, according to an example implementation. Referring to FIG. 5 in conjunction with FIG. 2, in accordance with example implementations, the tracker 220 uses a launching command and specific configuration parameters to launch a given processing unit 210. As an example, these parameters may specify the processing cores 112 (see FIG. 1) that are bound to the processing unit 210; parameters that identify the local memory node 114 (see FIG. 1), such as Non-Uniform-Memory-Access node, or socket where the specified processing cores 112 are located to restrict the memory allocated for the processing unit 210; and the number of worker threads in a thread pool to handle both the index building and index-based query search, as further described below.

In accordance with an example implementation, the following are constraints that are used between different parameters and the CPU/memory resources available. First, the in-memory tables of a given processing unit 210 are constrained to not have a size that exceeds the total amount of memory in the local memory node 110. In the following notation, the "Index Scaling Factor" refers to the statistical ratio between the total size of the index tables along all of the index building dimensions (R, L, query length, and so forth) and the size of the time series data partition that is used for index building. These constraints are related as follows:

[(1+Index Scaling Factor)×Data Partition Size×Number of Partitions Per Processing Unit]×Number of Processing Units on NUMA Node≤Total Local Memory on NUMA Node In accordance with example implementations, the total number of the processing cores 112 that are assigned to all of the processing units 210 do not exceed the total number of the processing cores 112 on the local memory node 110, as set forth below:

Number of Processors Assigned for Each Processing Unit×Number of Processing Units on NUMA Node≤Total Number of Processors on NUMA Node Moreover, in accordance with example implementations, for each processing unit 210, a number of worker threads are assigned for multi-threaded index building and processing, pursuant to the following relationship:

Number of Worker Threads Assigned for Each Processing Unit×Thread CPU Utilization≤Total Number of Processors Assigned for Each Processing Unit In accordance with example implementations, the processing unit 210 performs three primary functions: data loading, index building and index searching. In this manner, as shown in FIG. 5, the processing unit 210 loads 530 a time series data partition and index building related parameters from the persistent memory store 260; and the processing unit 210 stores 532 the time series data into a native memory 501. In accordance with example implementations, the native memory 501 may be a memory that is managed by C++ at runtime. In this loading phase, the LSH index related configuration parameters are also loaded for subsequent index building and index searching.

After the data partition's loading is performed, the processing unit 210 initiates the index building. In this regard, the processing unit 210 retrieves the time series data belonging to the partition and constructs the hash tables in the native memory 501 for each time series to build 534 the in-memory index. The index construction uses the LSH index related configuration parameters.

When the processing unit 210 receives a search query with a specified search pattern to be matched, the processing unit 210 begins the index-based search, which is conducted as a table lookup against the index tables that have been built in the native memory 501. The search result set includes the identified candidates that may potentially match the search pattern. For purposes of precisely identifying the top K similar time series segments that are closest to the search query, the processing unit 210 further performs a straightforward exhaustive search on the identified candidate set. The ratio between the total candidate set constructed from the data partition without any intelligent processing and the candidate set that is identified from the index-based search approach is thus a "search reduction," which may be on the order of 200 or more, in accordance with example implementations. The search reduction may be more or less than 200, in accordance with further example implementations.

As also depicted in FIG. 5, the coordinator 240 communicates commands 510 to the processing unit 210, and the processing unit 210 responds to the coordinator 240 with progress reports and partial search results 520. The ongoing partial search results 520, in turn, are collectively monitored from all of the processing units 210 by the coordinator 240 for purposes of determining whether to abandon the current search before searches have been performed at all search distances in the sequence of Rs, as further described below.

Figure 6:
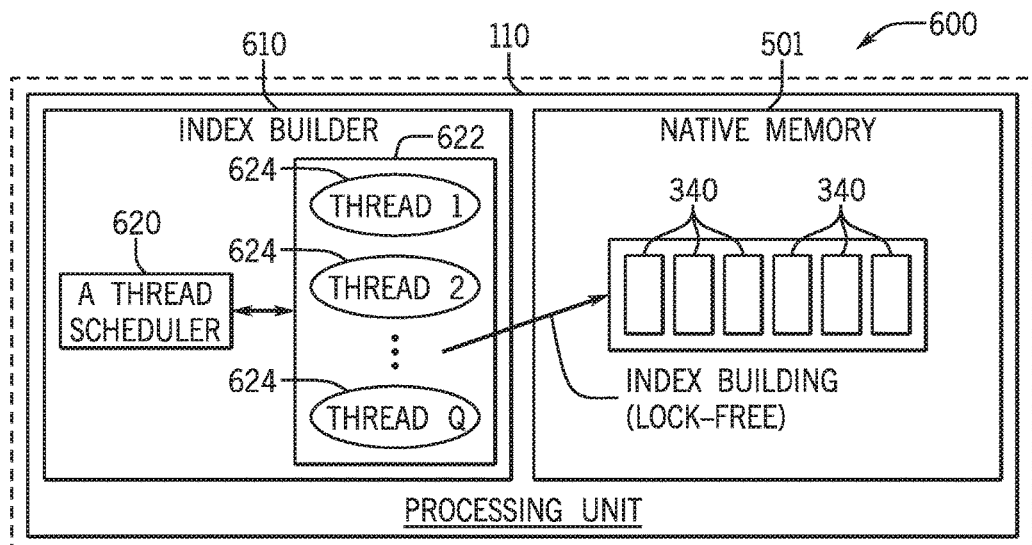
FIG. 6 is a schematic diagram of a logical processing unit and associated native memory illustrating multi-threaded index building according to an example implementation.

Referring to FIG. 6, in accordance with example implementations, the processing unit 210 has an index builder 610 for purposes of constructing the hash tables 340 in the native memory 501. As shown in FIG. 6, the index builder 610 may include a thread scheduler 620 and a set 622 of Q threads 624 that operate in a parallel fashion to construct the hash table collection 340. As described above, each time series data partition is associated with the N, R search parameters $\{R_1, R_2, \text{and } R_N\}$ and L tables. Thus, there are a total of N*L tables that are constructed. In the following discussion, "W" refers to the number of worker threads 624 are assigned for index building in each processing unit 210. Because W is much smaller than N*L, each worker thread 624 is assigned, on average, (N*L)/W number of tables for index table construction, in accordance with example implementations. It also implies that each index table is built entirely by a single worker thread 624, in accordance with example implementations. Therefore, in accordance with example implementations, table entry locking need not be used to synchronize the write of index tables between different threads, thereby making the index table building lock-free.

Figure 7:
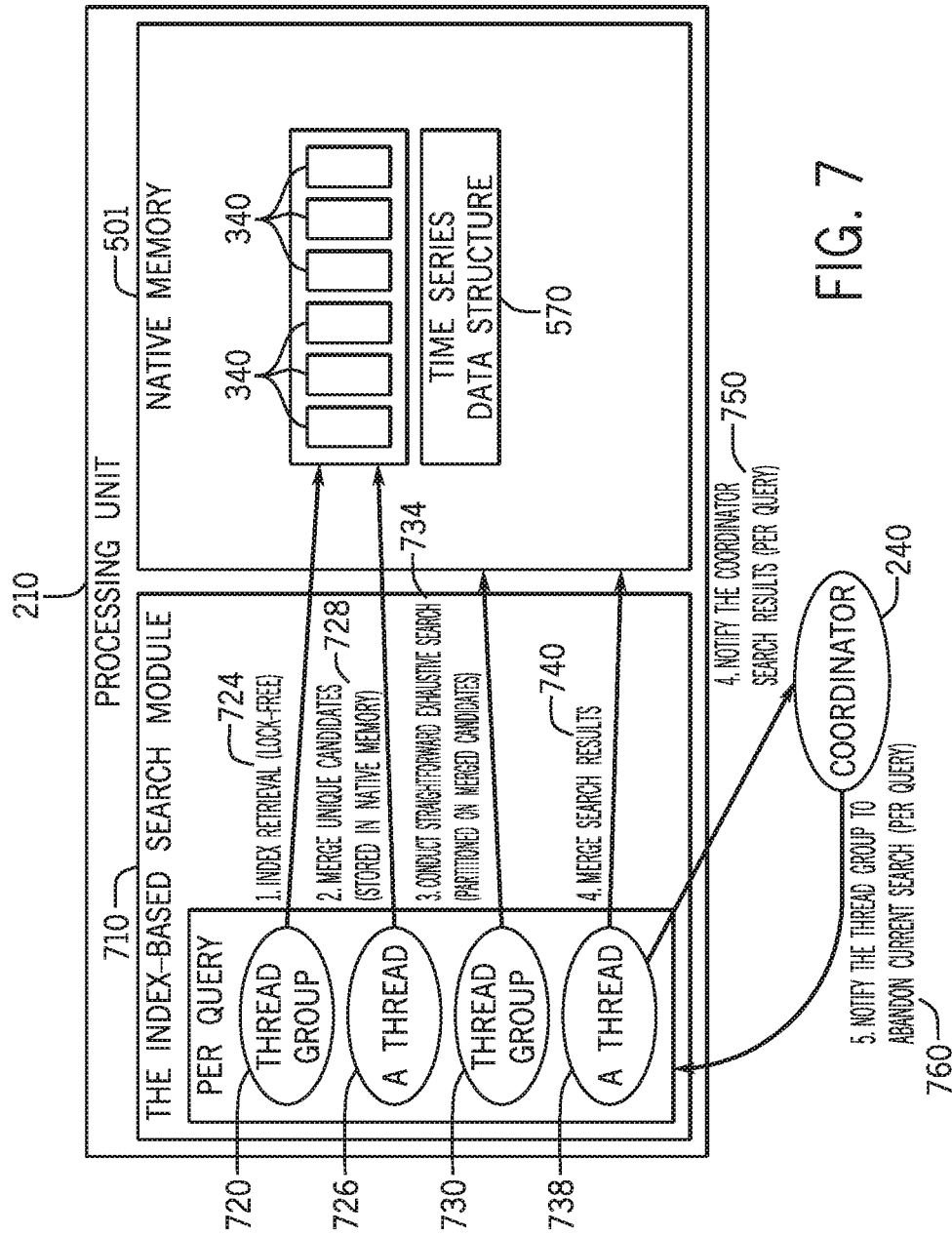
FIG. 7 is an illustration of specific threads of the index building and interaction of a logical processing unit with the coordinator for purposes of regulating the extent of a given search performed by the processing unit according to an example implementation.

Referring to FIG. 7, in accordance with example implementations, a given processing unit 210 includes an index-based search engine, or module 710, to perform a top K similarity search using a particular $R_i$ value. For each $R_i$ value, the processing unit 210 performs the search using a set of threads (assuming that there are W worker threads in each thread group) in the following four phases.

Referring to FIG. 7, in phase one, a thread group 720 of W worker threads is assigned to search against different L/W hash tables, as indicated at reference numeral 724, and then return the candidate set from the search of these L/W tables.

In phase two, a thread 726 merges 728 all of the candidate sets from different worker threads into a final candidate search result set for the particular $R_i$ value. Next, in phase three, a thread group 730 performs a straightforward exhaustive search 734 on the merged candidates. In accordance with example implementations, the final candidate search result is partitioned, such that each of the work threads in the thread group 730 work on some partitions in the sequence.

For example, assuming that the total number of candidates is represented by "S," then each partition has S/W number of candidates to be searched. The worker thread for each partition then conducts the naïve search over the partition for the purpose of finding the top K similar time series segments from this partition. In phase four, a thread 738 merges 740 all of the top K search results from all of the search partitions to form top K search results 750 that are communicated to the coordinator 240.

Based on the ongoing search results 750 aggregated from all of the processing units 210, the coordinator 240 may abandon processing the search query early. In this regard, in accordance with example implementations, all of the processing units 210 have the same R parameter set of $\{R_1, R_2, \ldots R_N\}$. For each $R_i$, the processing unit 210 notifies the coordinator 240 of the ongoing search results. The coordinator 240 collects all of the search results for each $R_i$. In accordance with example implementations, if the coordinator 240 determines that up to the current evaluation time, the total number of candidates that it has received exceeds K, then the coordinator 240 communicates an abort command (as indicated at reference numeral 760) to all of the processing units 210 to stop processing the search query. Before receiving such an abort command, however, each processing unit 210 advances its search to the next search round that uses the next R value in the R parameter set.

Referring back to FIG. 2, in accordance with example implementations, the tracker 220 is responsible for launching the processing units 210 and assigning the time series partition(s) for each of the launched processing unit 210. In accordance with example implementations, each processing unit 210 periodically communicates a "heartbeat" indication (a progress signal, ongoing search results and so forth) to the tracker 220 for purposes of notifying the tracker 220 that the processing unit 210 is "alive" and has not failed. In this manner, in accordance with example implementations, the processing units 210 communicate progress reports to the tracker 220 so that should a particular processing unit 210 fail, or "crash," no corresponding progress report is communicated to the tracker 220. Therefore, in the absence of such a progress report, the tracker 220 determines that the corresponding processing unit 210 has crashed, and the tracker 220 relaunches a new instance of the processing unit 210. In accordance with example implementations, the tracker 220 assigns the same time series partition and the same processing cores 112 (see FIG. 1) allocated from the same local memory node 110 to the relaunched processing unit 210.

It is noted that in accordance with example implementations, if the index building duration takes a sufficiently long time (a duration that exceeds 100 seconds, for example) to build the hash tables 240, pre-built hash tables 340 may be loaded from the persistent memory store 260, in lieu of the processing unit 210 building the tables. If the native memory 501 supports persistence, the re-launched processing unit 210 is able to automatically regain access to the hash tables that are constructed before a crash.

Figure 8:
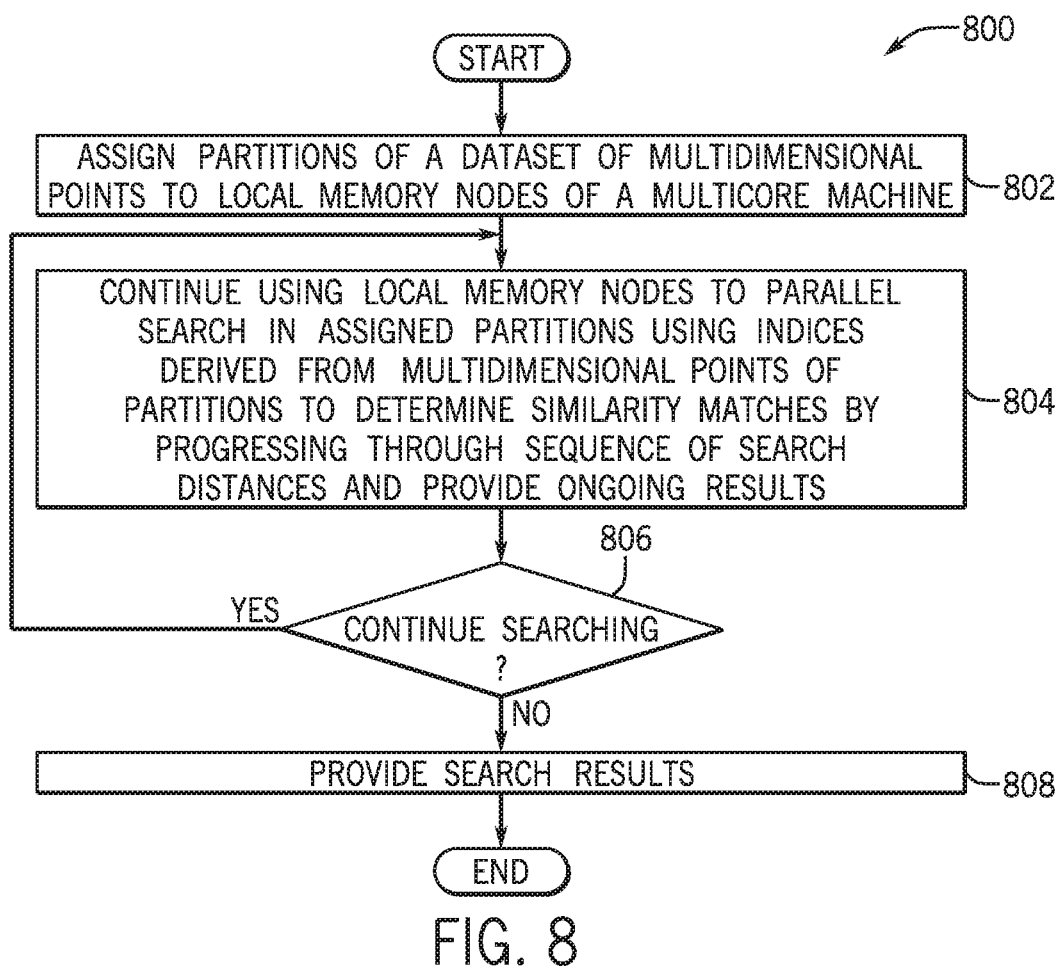
FIG. 8 is a flow diagram depicting a technique to use local memory nodes of a multicore machine to process a search query according to an example implementation.

Referring to FIG. 8, to summarize, in accordance with example implementations, a technique 800 to perform a search on a multidimensional point includes assigning (block 802) partitions of a dataset of multidimensional points to local memory nodes of a multicore machine. The local memory nodes are then used to conduct parallel search on the assigned partitions in the manner that considers a sequence of search distances. In this manner, pursuant to the technique 800, the local memory nodes are used (block 804) to continue to perform parallel search in assigned partitions using indices that are derived from the multidimensional points in the partitions to determine similarity matches by progressing through the sequence of search distances and provide ongoing search results. Based on these ongoing results, a determination is made (decision block 806) whether the searching is to continue, and if so, control returns to block 804. Otherwise, the search is halted and the search results are provided, pursuant to block 808.

Figure 9:
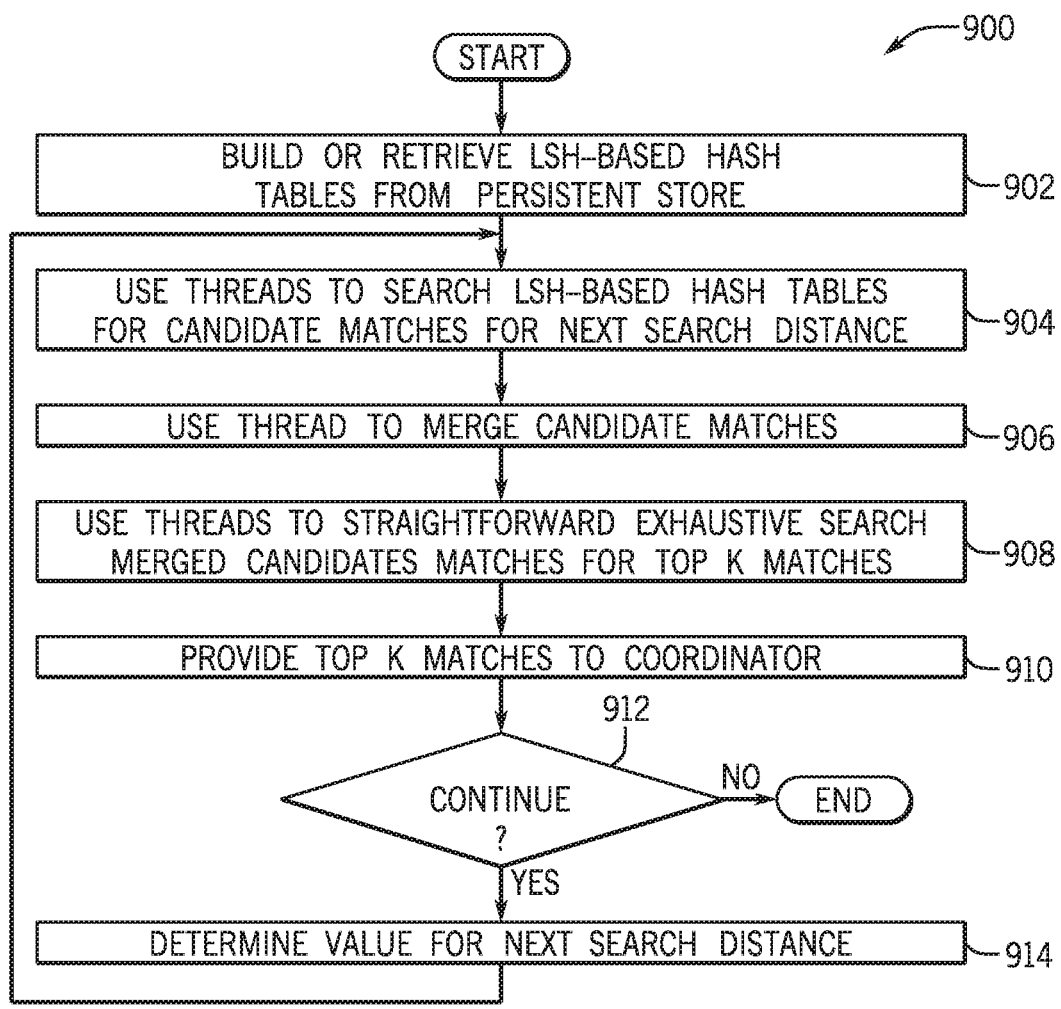
FIG. 9 is a flow diagram depicting a technique to perform searching on a local memory node of a multicore machine according to an example implementation.

Referring to FIG. 9, a given processing unit 210 may perform a multidimensional search, pursuant to the technique 900. The technique 900 includes building or retrieving LSH-based hash tables from a persistent store, pursuant to block 902, and using (block 904) threads to search LSH-based hash tables for candidate matches for the next search distance. A thread is also used (block 906) to merge candidate matches. Moreover, threads of the processing unit are used (block 908) to perform a straightforward exhaustive search of the merged candidate matches for the top K matches. The top K matches are then provided to the coordinator, pursuant to block 910. The coordinator then communicates with the processing unit 210 for purposes of selectively abandoning the current search. If a determination is made (decision block 912) that an abandonment command has not been received, then the processing unit determines (block 914) a value for the next search distance, and control returns to block 904.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A computer-implemented method of performing an efficient search of a dataset of multidimensional points, the method comprising:
    assigning partitions of the dataset of multidimensional points to a plurality of local memory nodes of a multicore machine having a processing unit for each local memory node;
    receiving a search query corresponding to a given multidimensional point;
    storing the partitions of the dataset into the local memory nodes to which they are assigned;
    storing index building parameters, including a plurality of search distances, into the local memory nodes;
    building, with the processing unit associated with each of the local memory nodes in parallel, a sequence of locality sensitive hash indexes of the partition of the dataset in that local memory node, each locality sensitive hash index associated with one of the plurality of search distances;
    performing, using the processing unit associated with each of the local memory nodes, parallel searching in the assigned partitions to identify candidate similarity matches to the given multidimensional point, the parallel searching for each processing unit and local memory node progressing through the sequence of locality sensitive hash indexes associated with the plurality of search distances;

providing, to a coordinator with each processing unit, an ongoing search result for each search distance from the given multidimensional point; and regulating, with the coordinator, an extent of the parallel searching based on the ongoing search results to determine similarity matches in the dataset for the given multidimensional point.

2. The method of claim 1, wherein the regulating the extent of the parallel searching comprises selectively halting the parallel searching based on a determination that a number of the ongoing search results exceeds a predetermined number.

3. The method of claim 1, wherein searching with at least one of the processing units and local memory nodes comprises:

using a plurality of threads to search the sequence of locality sensitive hash indexes in parallel.

4. The method of claim 3, wherein searching with at least one of the processing units and local memory nodes further comprises:

merging results of the searching of the sequence of locality sensitive hash indexes into a candidate search result set; and using the plurality of threads to perform a straightforward exhaustive search on the candidate search result set to identify the ongoing search result for one of the search distances.

5. The method of claim 1, further comprising:

merging the ongoing search results to determine the similarity matches.

6. The method of claim 1, wherein the parallel searching comprises performing locality sensitive hash (LSH) index-based searching.

7. The method of claim 1, wherein assigning the partitions to the local memory nodes comprises assigning the partitions to groups of processing cores that share a local memory.

8. An apparatus comprising:

a multicore machine comprising a plurality of local memory nodes each storing index building parameters, including a plurality of search distances;

a plurality of processing units, each configured to search one of a plurality of partitions of a dataset, each partition stored in one of the local memory nodes; and a coordinator to, in response to a query for matches in the dataset to a given multidimensional point:

initiate parallel searching by each of the processing units in the one of the partitions of the dataset stored in the local memory node for that processing unit to identify candidate similarity matches to the given multidimensional point, wherein each processing unit searches by:

building, in parallel, a sequence of locality sensitive hash indexes of the partition of the dataset in the local memory node for that processing unit, each locality sensitive hash index associated with one of the plurality of search distances; and progressing through the sequence of locality sensitive hash indexes associated with the plurality of search distances;

receive an ongoing search result from each processing unit for each search distance; and collect the ongoing search results and selectively halt the parallel searching in response to determining that the collected ongoing search results satisfy the query.

9. The apparatus of claim 8, wherein the local memory nodes comprise non-uniform memory access architecture (NUMA) nodes.

10. The apparatus of claim 8, further comprising:

a persistent memory store to store the dataset.

11. The apparatus of claim 10, wherein the persistent memory further stores data representing the indexes.

12. The apparatus of claim 10, further comprising a tracker to launch the processing units, assign the partitions to the processing units and relaunch a given processing unit in response to determining that the processing unit has failed.

13. An article comprising a non-transitory computer readable storage medium storing instructions for performing an efficient search of a dataset of multidimensional points that, when executed by a computer cause the computer to:

assign partitions of the dataset of multidimensional points to a plurality of local memory nodes of a multicore machine having a processing unit for each local memory node;

receive a search query corresponding to a given multidimensional point;

store the partitions of the dataset into the local memory nodes to which they are assigned;

store index building parameters, including a plurality of search distances, into the local memory nodes;

build, with the processing unit associated with each of the local memory nodes in parallel, a sequence of locality sensitive hash indexes of the partition of the dataset in that local memory node, each locality sensitive hash index associated with one of the plurality of search distances;

perform, by use of the processing unit associated with each of the local memory nodes, parallel searching in the assigned partitions to identify candidate similarity matches to the given multidimensional point, the parallel searching for each processing unit and local memory node progressing through the sequence of locality sensitive hash indexes associated with the plurality of search distances;

provide, to a coordinator with each processing unit, an ongoing search result for each search distance from the given multidimensional point; and regulate, with the coordinator, an extent of the parallel searching based on the ongoing search results to determine similarity matches in the dataset for the given multidimensional point.

14. The article of claim 13, the storage medium storing instructions that when executed by the computer cause the computer to perform locality sensitive hash (LSH) index-based searching.

15. The article of claim 13, wherein the local memory nodes comprise non-uniform memory architecture (NUMA) nodes.

* * * * *